United States Patent [19]

Reighter

[11] 4,267,402

[45] May 12, 1981

[54] POLYMER CONCRETE BODY WITH VIBRATION MOLDED THREADS, METHOD OF MAKING SAME, AND ELECTRICAL INSULATOR PROVIDED WITH THE SAME

[75] Inventor: David H. Reighter, Roslyn, Pa.

[73] Assignee: Gould Inc., Rolling Meadows, Ill.

[21] Appl. No.: 48,722

[22] Filed: Jun. 15, 1979

Related U.S. Application Data

[63] Continuation-in-part of Ser. No. 931,493, Aug. 7, 1978, abandoned.

[51] Int. Cl.³ .................. H01B 17/14; H01B 3/40; B29D 1/00
[52] U.S. Cl. .......................... 174/137 R; 174/206; 174/209; 264/71
[58] Field of Search .......... 174/137 R, 137 B, 138 R, 174/138 D, 174, 176, 177, 178, 202, 206, 209; 85/DIG. 2; 249/59; 260/37 EP; 264/69, 71, 72

[56] References Cited

U.S. PATENT DOCUMENTS 3,803,279  4/1974  Bailey, Jr. et al. .................. 264/71

Primary Examiner—Laramie E. Askin
Attorney, Agent, or Firm—Ostrolenk, Faber, Gerb & Soffen

[57] ABSTRACT

A superior insulator body having at least one thread is produced by vibration molding an acicular aggregate and a synthetic resin binder against an appropriate die.

35 Claims, 6 Drawing Figures

POLYMER CONCRETE BODY WITH VIBRATION MOLDED THREADS, METHOD OF MAKING SAME, AND ELECTRICAL INSULATOR PROVIDED WITH THE SAME

CROSS REFERENCE TO RELATED APPLICATION

This is a continuation-in-part of application Ser. No. 931,493, filed Aug. 7, 1978, entitled Polymer Concrete With Cast Threads, now abandoned.

BACKGROUND OF THE INVENTION

The need to attach electrical components such as wires and the like to insulation bodies is usually satisfied by bolting the component into the body. The insulator bodies are usually made of porcelain and any threads in such porcelain bodies are so difficult to produce that they are rarely, if ever, made. If they were produced for some specific reason, a bolt or other fastener inserted into these threads easily strips the threads so that the attached component easily pulls loose from the insulator body. To make attachments to porcelain, it is conventional to cement a metal cap to the insulator body and to attach the electrical components to the metal cap.

The conventional metal caps have three major disadvantages, namely they present a large area of conductive metal, the cap is the most expensive part of the insulator structure, and the incompatability of the thermal characteristics between the metal and the porcelain gives rise to additional problems. Despite these disadvantages, the metal cap has been considered necessary and is in widespread commercial use.

It has now been discovered that if an insulator body is made of a particular material and threads are formed in that body in a particular way, the metal cap and its associated disadvantages can be completely eliminated. The threads formed are even stronger than the rest of the insulator body.

Accordingly, it is the object of this invention to provide a superior insulator body having one or more threads therein which are strong and resistant to stripping so that the conventional metal caps can be eliminated. This and other objects will become apparent to those skilled in the art from the following description in which.

SUMMARY OF THE INVENTION

This invention relates to a superior insulator body having threads therein. More particularly, it relates to a superior body having at least one thread vibration molded therein, the body being formed from an acicular aggregate and a synthetic resin binder. The invention also relates to the method of making the insulator body.

DESCRIPTION OF THE INVENTION

Figure 3:
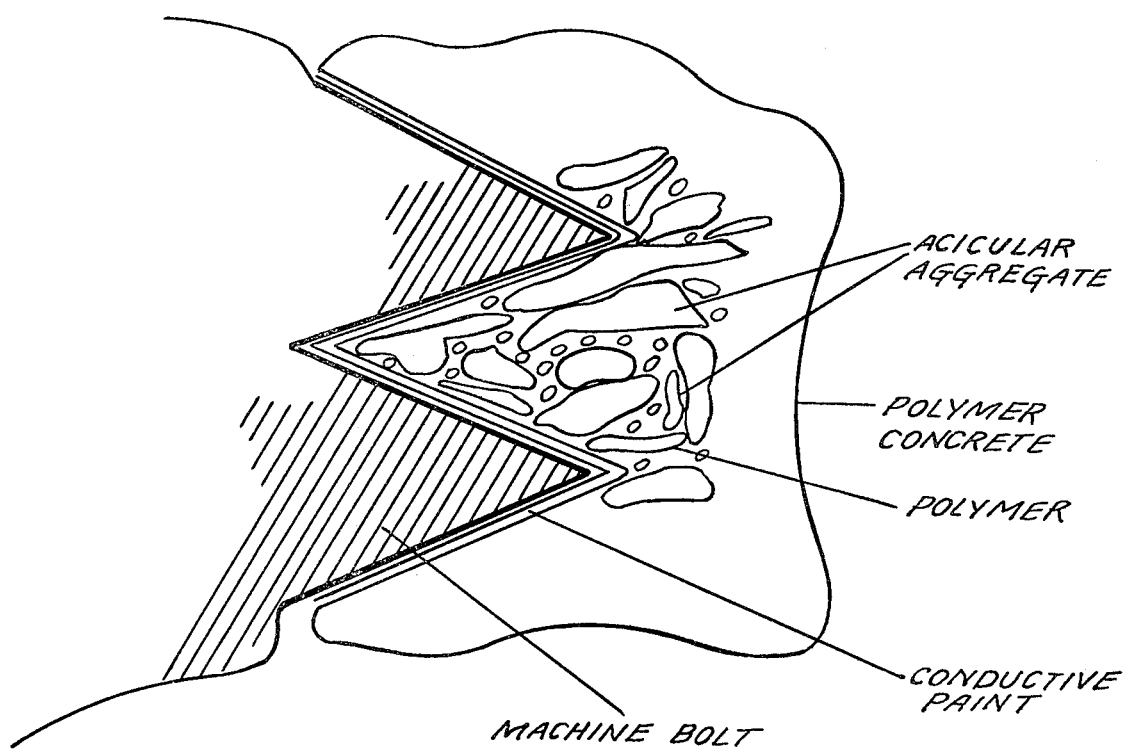
FIG. 3 is a representation of a cross-section of a thread formed in accordance with the present invention.

The polymer concrete of the present invention is a mixture of a curable resin and acicular aggregate. The polymer can be any curable resin, preferably electrical insulation grade, which will bind the aggregate particles together and substantially fill the porosity when it is hardened. Accordingly, epoxy resins, polyester resins, polyurethane resins, polyolefin resins, silicone resins, acrylic resins, phenolic resins and the like can be used. The polymer is chosen from commercially available products on the basis of its physical aspects, electrical characteristics, hydrophobic characteristics, ability to bind the aggregate and handleability. The preferred polymer is an electrical insulation grade epoxy resin. It will be understood by those skilled in the art that a polymer can contain a curing agent which is adapted to be effective in other than ambient conditions. For example, it is preferred to formulate the epoxy resin polymer with a suitable hardening agent and catalyst, such as an anhydride or amine, which cures the epoxy resin at elevated temperature. It is also preferred to use a polymer which has a modulus of elasticity in the range of about $2-10 \times 10^6$ psi (about $1.4-7 \times 10^5$ kg/cm$^2$) because this will allow small thread deformation when a load is applied to cast threads. The deformation will act to distribute the stress over the entire thread engagement length and provide maximum strength to the threads. Further, as shown in FIG. 3, the aggregate particles are subjected to compression and shearing stresses when the threads are loaded and this is when maximum strength is attained.

The majority of the aggregate particles, i.e., greater than 50%, are acicular particles. Preferably, the acicular particles constitute about 65-75% of the aggregate. Any electrically insulating material which can be obtained in acicular shape can be used and it has been found that electrical grade porcelain when crushed forms an excellent acicular aggregate with all the desired properties. Other ceramic aggregates such as steatite, alumina, titanate, spinels, mullites, sillimantes, zircons, and the like or natural aggregates can be used if they can be obtained in acicular form or if they are specially processed to attain such form. The remainder of the aggregate can be those materials which are normally used as fillers in synthetic organic polymer insulations. The conglomeration of materials forming the aggregate should have a variety of particle sizes to reduce the amount of volume which will be filled by the binder portion of the concrete. Preferably, at least two different sizes of acicular material, adapted to the size of threads, are used.

Since the binder is usually the most expensive material in the polymer concrete, it is preferred to keep its concentration in the binder-aggregate admixture as low as practical. In general, the aggregate will be about 70-95% of the admixture, preferably about 80-90%.

It has been found necessary to mix the binder and the aggregate under a vacuum in order to eliminate large voids and express air in the final product and to insure a complete wetting of the aggregate with the binder resin. A vacuum above 27 inches of mercury, and preferably about 29-30 inches of mercury has been found to be appropriate. For ease of handling, it is preferable to conduct the mixing under an elevated temperature which is below the curing temperature of the binder. Generally temperatures of about 50°-125° C. and preferably about 70°-90° C. are suitable if an epoxy resin adapted to cure at about 150° C. is utilized. The time of mixing is not critical and optimum time intervals can readily be established by a few simple experiments. It is not necessary to vacuum cast the material since it has been found that the existence of a plurality of small voids does not detract from the insulator performance of this product, although such vacuum casting can be done if the complete absence of voids is necessary.

The mixing of the aggregate and the binder is accomplished in a separate apparatus followed by introduction of the admixture into the mold. A suitable threaded member can be placed in the mold either before filling with the admixture or can be inserted into admixture after the mold is filled.

In accordance with the invention, the acicular particles in the admixture which are adjacent the threaded insert, or other mold surface, are caused generally to align parallel with one another and with the insert or mold surface. Thus, the admixture in the region of the thread will have the acicular particles in that region generally parallel to one another to produce an exceptionally and unexpectedly strong thread region. The alignment of the acicular particles at the insert region must be caused by a mechanism, preferably vibration, but also as by centrifugal casting or the like, which entails the application of alignment forces on the acicular particles before the admixture hardens.

It is preferable to vibrate against the threaded member in order to achieve the objects of this invention. Machined-in threads do not have the strength of the threads of this invention and would be very difficult and expensive to produce due to the hardness of the aggregate. The amplitude of vibration is not critical and can be varied as desired as long as it is not so violent as to trap air in the admixture. This can be readily ascertained by observation and a just sufficient amplitude should be applied to give mobility to the mass. It is preferred to conduct the vibration at the same temperature as the mixing of the aggregate and the binder but any temperature below the curing point of the binder can be employed if desired. The length of time vibration continues is a function of the amplitude of the vibration and the temperature conditions. The vibration should be continued at least until the extrusion of binder resin on the surface of the admixture can be observed and preferably until the extrusion has substantially ceased. This observation of extrusion of a vibrating mixture is similar to that encountered when vibrating Portland cement concrete.

When vibration is complete, the admixture is cured by raising the temperature to or above the curing temperature of the binder resin. As is known in the art, voiding can be eliminated during cure by applying slight pressure to the admixture. The admixture can be completely cured in the mold or alternatively after the binder has gelled, the admixture can be ejected from the mold and cured in an oven thereby freeing the mold for other operations.

Figure 1:
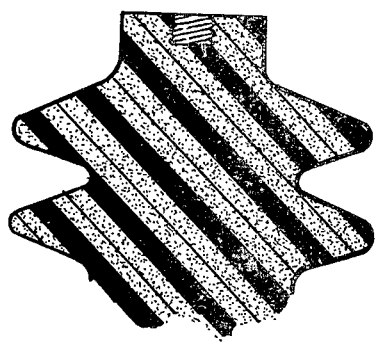
FIG. 1 is a cross-section of a first embodiment of this invention.
Figure 2:
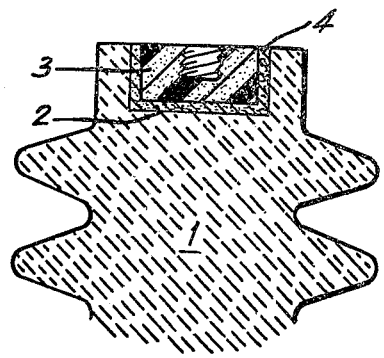
FIG. 2 is a cross-section of a second embodiment of this invention.

FIGS. 1 and 2 illustrate two embodiments of the present invention. The configuration shown in FIG. 1 is of a polymer concrete station post insulator which was prepared as described above as a single unit. The embodiment of FIG. 2 shows a porcelain station post insulator whose main body 1 was prepared by conventional means and having a receptacle portion 2 which is adapted to receive an insert 3 of the body of the instant invention which is cemented in place with the suitable adhesive 4.

It is preferred to coat the threads of this invention with a conductive paint, such as those having a graphite or silver base. Such a paint distributes the electrical stress around an inserted metal bolt and lubricates the threads making for ease of insertion and removal.

Figure 4:
FIGS. 4, 5 and 6 are photomicrographs of threads formed in accordance with the present invention.
Figure 5:
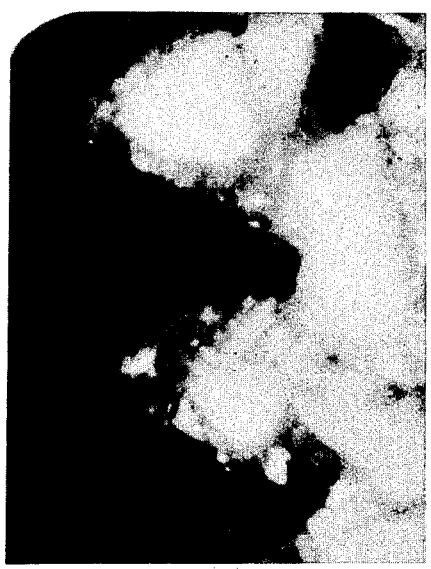
Figure 6:

Without being limited to theory, it is believed that the high strength of the threads prepared in accordance with the present invention is a result of the alignment of the acicular aggregate in that portion of the concrete body which forms the thread. This alignment is shown in FIG. 3. This theory appears to be confirmed by the photomicrographs which form FIGS. 4, 5 and 6 which show threads prepared in accordance with the present invention using the composition of Example 3 below at a tenfold, twentyfold and thirtyfold magnification, respectively.

It will be appreciated that while FIGS. 1 and 2 will show only a single molded-in thread, any number of threads desired can be molded into the bodies of the present invention. Furthermore, the tensile thread strength can be controlled by varying the thread depth.

In order to further illustrate the invention, various examples are set forth below. Throughout this specification and claims, all parts and percentages are by weight and all temperatures and degrees are Centigrade unless otherwise specified.

Four station post insulators were prepared with the ingredients set forth in Table 1 below. The aggregate (crushed porcelain and sand) and the epoxy resin binder with curing agents were combined in a Ross blender and mixed under approximately thirty inches of mercury vacuum at 90° C. for four minutes. A mold containing a male thread die with a suitable release coating and preheated to 150° C. was placed on a vibratory table and the vibration begun. The mold was filled with the admixture while vibrating. The mold was then pressurized at its sprue with 25 psi air. After thirty minutes at 150° C. in the thermostatically heated mold, the station post were ejected and placed in an oven for an additional three hours at 150° C. to complete the cure.

TABLE 1

| Component | Ex 1 | Ex 2 | Ex 3 | Ex 4 |
|---|---|---|---|---|
| Hydantoin epoxy resin (1) | 148 | 148 | — | — |
| Cycloaliphatic epoxy resin (2) | — | — | 140 | 140 |
| Methyl tetrahydrophthalic anhydride | 174 | 174 | 132 | 132 |
| Benzoyl dimethylamine | 0.75 | 0.75 | — | — |
| Catalyst (45% methanolic solution of 2-hydroxyethyl trimethylammonium hydroxide) | — | — | 0.68 | 0.68 |
| Polypropylene oxide triol (M.W. 5000) | — | — | 34 | 34 |
| Polypropylene oxide triol (M.W. 710) | — | — | 34 | 34 |
| Modaflow (3) flow additive in 50% epoxy employed | 4 | 4 | 2 | 2 |
| 16 Mesh Felspatic Porcelain | 756 | — | 756 | — |
| 16 Mesh Alumina Porcelain | — | 846 | — | 846 |
| Through 30 on 100 mesh Felspatic Porcelain | 396 | — | 396 | — |
| Through 30 on 100 mesh Alumina Porcelain | — | 444 | — | 444 |
| 325 Mesh crushed quartz | 510 | 510 | 510 | 510 |

(1) XB-2793 from Ciba Geigy Corp.
(2) ERL-4221 from Union Carbide Corp.
(3) trademark Dow Chemical Co.

In all four formulations, the strong threads were realized.

The insulator of Example 2 was measured for corona by the balanced sample method of the Biddle corona bridge. There was no detectable corona up to 65 kV and at 70 kV, the insulator had 10-30 pC of corona.

All of the station posts had a high heat distortion temperature, greater then class N(200° C.).

A machine bolt was inserted into the cast threads in each of the four station post insulators and a force applied to pull the bolt out without unscrewing it. In each case, the body of the insulator broke before the threads stripped. With station posts prepared with sand or another non-acicular filler as the aggregate, the threads stripped easily while the body of the insulator remained intact.

A 3 inch diameter cylinder containing a ½-13×1" deep thread was prepared as described above using the composition of Example 3. A bolt was inserted and a pull test conducted. It required 8,990 pounds in direct tension to fracture the cylinder. The thread remained intact.

Various changes and modifications can be made in the process and products of this invention without departing from the spirit and scope thereof. The various embodiments disclosed herein were for the purpose of further illustrating the invention but were not intended to limit it.

I claim:

1. A body of an acicular aggregate bonded by a cured synthetic resin binder having at least one thread vibration molded therein.

2. The body of claim 1 wherein said aggregate comprises electrical grade porcelain.

3. The body of claims 1 or 2 wherein said resin is an epoxy resin.

4. The body of claim 1 containing a plurality of said threads.

5. The body of claim 1 comprising about 5-30 percent by weight binder.

6. The body of claim 5 comprising about 10-20 percent by weight binder.

7. The body of claim 1 wherein said resin has a modulus of elasticity in the range of about $2-10 \times 10^6$ psi.

8. The body of claim 7 wherein said resin is an epoxy resin, about 65-75% by weight of said aggregate is electrical grade porcelain, and said binder is about 10-20% by weight of said body.

9. The body of claim 1 in the form of a station post insulator.

10. The body of claim 1 in the form of an insert adapted to be cemented to an electrical insulator.

11. A method of manufacturing a body of an acicular aggregate bonded by a cured synthetic resin binder having at least one thread vibration molded therein comprising mixing of said aggregate and uncured synthetic resin binder under a vacuum of at least about 27 inches of mercury, vibration molding the resulting admixture against at least one thread die, and curing said polymer.

12. The method of claim 11 wherein said binder is about 5-25 percent by weight of said mixture.

13. The method of claim 12 wherein said binder is about 10-20 percent by weight.

14. The method of claim 11 wherein said vacuum is about 29-30 inches of mercury.

15. The method of claim 11 wherein said aggregate is electrical grade porcelain.

16. The method of claim 4 wherein said synthetic resin is an epoxy resin.

17. The method of claim 11 wherein said resin has a modulus of elasticity in the range of about $2-10 \times 10^6$ psi.

18. The method of claim 17 wherein said resin is an epoxy resin, about 65-75% by weight of said aggregate is electrical grade porcelain, said binder is about 10-20% weight of said body, and said vacuum is about 29-30 inches of mercury.

19. A body of acicular aggregate elements bonded by a cured synthetic resin binder having at least one thread therein; the acicular aggregate elements being aligned generally parallel to each other in regions adjacent said thread surface and being randomly aligned in the bulk of said body.

20. The body of claim 19, wherein said thread is vibration molded in said body.

21. The body of claim 19, wherein said resin is an epoxy resin.

22. The body of claim 19, containing a plurality of said threads.

23. The body of claim 19, comprising about 5-30 percent by weight binder.

24. The body of claim 23, comprising about 10-20 percent by weight binder.

25. The body of claim 19, wherein said resin has a modulus of elasticity in the range of about $2-10 \times 10^6$ psi.

26. The body of claim 25, wherein said resin is an epoxy resin, about 65-75% by weight of said aggregate elements is electrical grade porcelain, and said binder is about 10-20% by weight of said body.

27. The body of claim 19, in the form of an insert adapted to be cemented to an electrical insulator.

28. A method of manufacturing a body of acicular aggregate elements bonded by a cured synthetic resin binder having at least one thread therein, the acicular aggregate elements being aligned generally parallel to each other in regions adjacent said thread surface and being randomly aligned in the bulk of said body, comprising mixing of said aggregate elements and uncured synthetic resin binder under a vacuum of at least about 27 inches of mercury, providing a threaded die in contact with a part of said mixture, causing the acicular aggregate elements adjacent the surface of the threaded die to be generally parallelly aligned with one another, and curing said polymer.

29. The method of claim 28 wherein said binder is about 5-25 percent by weight of said mixture.

30. The method of claim 29, wherein said binder is about 10-20 percent by weight.

31. The method of claim 28, wherein said vacuum is about 29-30 inches of mercury.

32. The method of claim 28, wherein said aggregate elements are electrical grade porcelain.

33. The method of claim 28, wherein said synthetic resin is an epoxy resin.

34. The method of claim 28, wherein said resin has a modulus of elasticity in the range of about $2-10 \times 10^6$ psi.

35. The method of claim 34, wherein said resin is an epoxy resin, about 65-75% by weight of said aggregate elements is electrical grade porcelain, said binder is about 10-20% by weight of said body, and said vacuum is about 29-30 inches of mercury.

* * * * *